July 17, 1962  P. D. GEORGE  3,044,322
TOOL HEAD WITH MICROMETER ADJUSTMENT AND DIAL INDICATOR
Filed March 27, 1958

INVENTOR.
Peter D. George
BY
Morse & Altman

United States Patent Office 3,044,322
Patented July 17, 1962

3,044,322
TOOL HEAD WITH MICROMETER ADJUSTMENT AND DIAL INDICATOR
Peter D. George, Quincy, Mass., assignor to Bokum Tool Company, Inc., Detroit, Mich., a corporation of Michigan
Filed Mar. 27, 1958, Ser. No. 724,331
8 Claims. (Cl. 77—58)

The present invention relates to machine tools and, more particularly, to mounting heads of a type that is carried for rotation by a boring machine or the like and that mounts a tool bit or the like for rotation with the head about an adjustable radius from an axis of rotation, or for stationary displacement from a fixed center.

The primary object of the present invention is to provide such a mounting head, of unprecedented simplicity and accuracy, possessing an adjusting micrometer for precisely positioning a tool and an amplifying indicator for producing a major mechanical rotation in response to a minor motion of the tool. This mounting head is characterized by a ram, movable by micrometer adjustment, which ram presents a guiding face of substantial extent that is pressed against a corresponding constraining face in order to maintain the ram in predetermined orientation and which ram carries for movement therewith a pin that normally moves therewith to actuate an indicator but that slides with respect thereto when the motion of the indicator is operatively limited. Another object of the present invention is to provide a mounting head of the foregoing type in which the guiding and constraining faces are composed of a hard steel possessing a hardness designation within the range of 60 to 68 Rockwell C.

The other objects of the present invention will in part be obvious and will in part appear hereinafter.

The invention thus provides a device possessing the construction, combination of elements and arrangement of parts which are exemplified in the following detailed disclosure, and the scope of which will be indicated in the appended claims.

For a fuller understanding of the nature and objects of the present invention, reference should be had to the following detailed description taken in connection with the accompanying drawings wherein.

Figure 1:
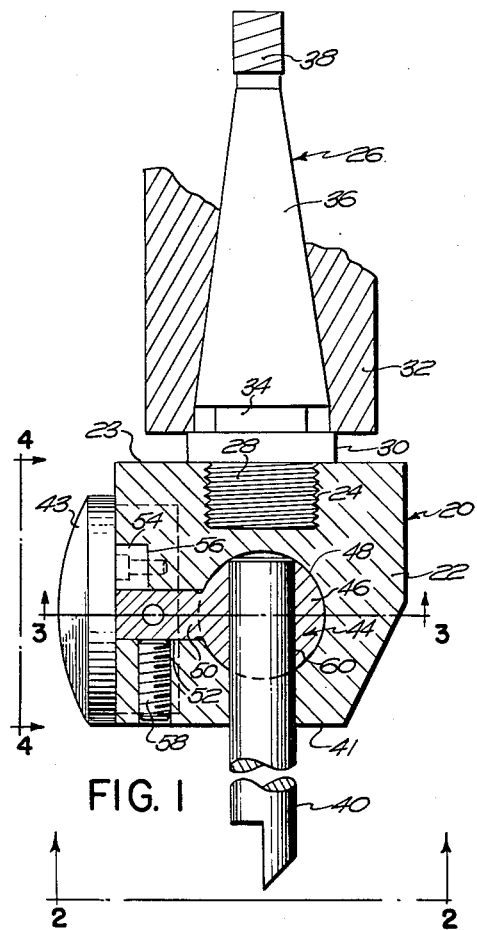
FIGURE 1 illustrates a mounting head embodying the present invention, the mounting head being carried by the driving shaft of a boring machine or the like and, in turn carrying a boring tool.

Generally FIG. 1 shows a mounting head 20 constructed in accordance with the present invention. Head 20 comprises a housing 22 having an upper flat face 23, which presents an internally threaded bore 24. Bore 24 is designed to receive the threaded lower extremity of a shank 26 of any design. Shank 26 is shown as integrally including: a threaded extremity portion 28 turned into threaded bore 24; a collar portion 30 adapted to abut against upper face 23 of housing 22 and lower face of a hollow drive shaft 32; a hexagonal key portion 34 which is received by a corresponding hexagonal seat in shaft 32; a tapering portion 36 which is received by a corresponding tapering seat in shaft 32; and a male locking thread 38 which is designed to be mated with a corresponding female locking thread (not shown) in shaft 32.

Figure 3:
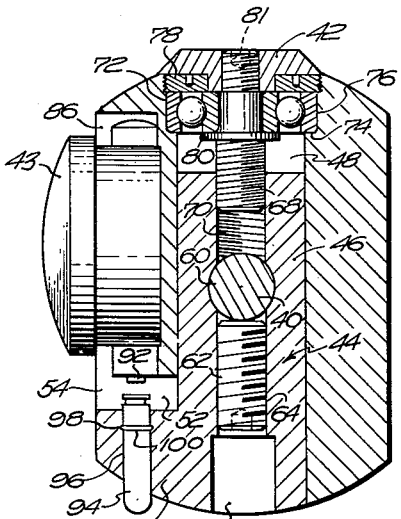
FIGURE 3 is a cross sectional view of the boring head of FIG. 2, taken substantially along the line 3—3.
Figure 4:
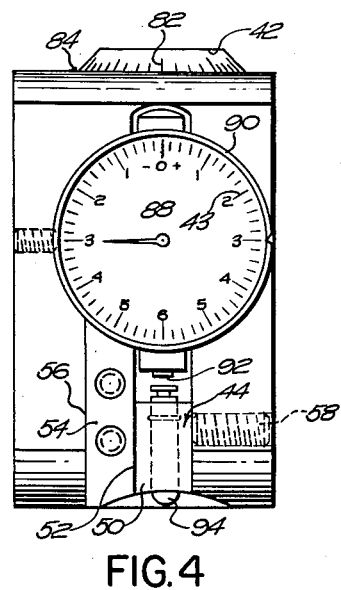
FIGURE 4 is a side plan view of the boring head of FIG. 2, taken substantially along the line 4—4.
Figure 2:
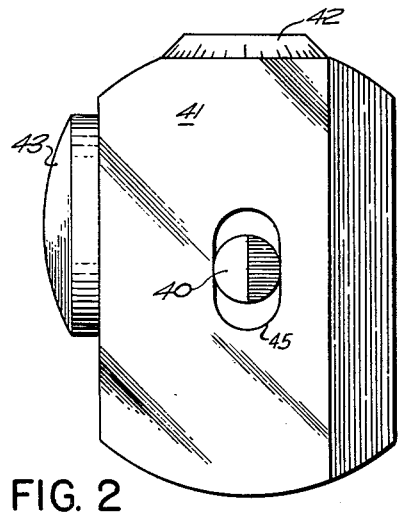
FIGURE 2 is a bottom plan view of the boring head of FIG. 1.

In FIGS. 1 and 2 mounting head 20 is shown as carrying a boring tool 40, the axis of which may be moved between positions coincident with and parallel to the axis of shaft 32. The distance between the axis of boring tool 40 and the axis of shaft 32 is controlled by rotation of a micrometer head 42 and is precisely readable on a dial indicator 43 in a manner now to be described (FIGS. 3 and 4). Tool 40 extends from within housing 20 perpendicularly to the lower face 41 of housing 20, through an elongated slot 45. Slot 45 permits the tool to be moved between a position at which its axis is coincident with the axis of driving shaft 32 and a position at which its axis is predeterminedly spaced from the axis of driving shaft 32.

The upper end of boring tool 40 is carried by a ram 44, which is slidable in housing 20. Ram 44 includes a cylindrical body portion 46 which slidably fits into a cylindrical bore 48 in housing 20. At one of the extremities of body portion 46 is a fin portion 50 having a pair of parallel opposed faces. Fin portion 50 is slidable within a guide channel 52 that communicates with bore 48. One of the faces of fin 50 bears against a face of a locating block 54 that is set into a notch 56 at the outer edge of channel 52. The pressure with which the abutting faces of fin 50 and locating block 54 frictionally engage is controlled by a set screw 58, which is turned into an internally threaded bore in housing 20 and is directed against the other face of fin 50. The inner end of boring tool 40 is seated in a bore 60, the axis of which is perpendicular to the faces of fin 50. Tool 40 is locked in bore 60 by a set screw 62 which is turned into a threaded bore 64 in ram 44. The axis of threaded bore 64 is perpendicular to the axis of bore 60 and lies in a plane which is parallel to the faces of fin 50. The outer extremity of set screw 62 is accessible through an enlarged bore 66 that extends from bore 64 through an extremity of ram 44.

The foregoing arrangement ensures that the axis of tool 40 remains precisely parallel to the axis of driving shaft 32 regardless of the position of ram 44 in housing 20. Thus, the face of fin 50 bears against the associated face of locating block 54 with a constant pressure that is determined by a set screw 58 and that is transmitted to cylindrical body portion 46 of the ram, which in consequence bears against the corresponding cylindrical portion of bore 48. In other words, the face of fin 50 remote from set screw 58 is pressed against the associated face of locating block 54 and the surface of cylindrical portion 46 is pressed against the associated surface of bore 48 in order to precisely constrain ram 44 for nonrotational and unidirectional motion. In order to ensure the foregoing coaction between locating block 54 and ram 44, both of these components are composed of hard steel with the range of from 60 to 68 Rockwell C. Housing 20 may be composed of high grade bearing steel that may be relatively soft in comparison with the steeel of which the ram and the locating block are composed.

The axial position of ram 44 in bore 48 is determined by a micrometer screw 68, which meshes with the internal threading of a bore 70 in ram 44. It will be observed that the axis of bore 70 coincides with the axis of bore 64, being coincident with the axis of cylindrical portion 46 of ram 44. Micrometer screw 68 is mounted for rotation on a ball bearing 72. The outer race of 72 is seated against a cylindrical step 74 provided between bore 48 and a bore 76 of increased diameter continuing therefrom through the outer face of housing 20. The outer race of bearing 72 is clamped against step 74 by a nut 78, which is turned into threads at the outer extremity of bore 76. The inner race of bearing 72 is clamped against a collar 80 of micrometer screw 68 by the shank of micrometer head 42. Micrometer head 42 is internally threaded to receive the externally threaded outer extremity of micrometer screw 68. Micrometer head 42 is provided with indicia 82 that cooperate with a pointer 84 to give a coarse micrometer adjustment.

The outer extremity of micrometer screw 68 presents a hex socket 81 for the reception of an adjusting hex wrench.

A fine indication of the axial position of ram 44 is provided by a dial indicator 43, which is seated in a depression 86 in housing 29. Dial indicator includes a pointer 88 which is rotatable under a dial 90. Dial 90, which is manually adjustable in rotational position, lies in a plane that is perpendicular to the opposed faces of fin 50. Pointer 88 is actuated by a reciprocable rod 92 through amplifying gearing, a minor reciprocal motion of rod 92 resulting in a major rotational motion of pointer 88. Rod 92 is pressed into its extreme outward position by a spring (not shown) and may be urged inwardly by a pin 94 that is slidable within a bore 96 in fin portion 50. The axis of pin 94 is parallel to the axis of the cylindrical portion 46 of ram 44. A friction generating ring 98, in the form of rubber or rubber-like O-ring or an expansion spring is seated in a circumferential groove 100 in pin 94 and presses against the surface of bore 96. The friction generated by ring 98 normally is sufficient to cause pin 94 to travel with ram 44 against the spring bias imparted to rod 92. In other words, normally pin 94 and ram 44 move as a unit to impart to rod 92 any travel produced by micrometer screw 68. In order to prevent harm to indicator 43, however, when rod 92 has been urged into its innermost position, any further movement of ram 44 causes a sliding motion between pin 94 and ram 44 by overcoming the frictional forces generated by ring 98.

In practice the boring head disclosed above is used as follows. First, a rough approximation of the final diameter of a hole to be bored is made via head 42. The initial hole is drilled, say with a diameter of approximately 1/64 of an inch less than the diameter precisely desired. Next, a gage is employed to determine the actual diameter of the initial hole. Next, pin 94 is manually set against rod 92 in a suitable manner. Next, dial 43 is rotated until it is zeroed on pointer 88. Then micrometer screw 68 is rotated gradually until pointer 88 indicates that the precise change in the position of tool 40 has been effected in order to increase the radius of the initial hole by the necessary amount. The radius of the initial hole is then increased by the rotation and reciprocation of tool 40. In this way the diameter of the final hole is precisely determined.

Since certain changes may be made in the above device without departing from the scope of the invention herein involved, it is intended that all matter contained in the above description or shown in the accompanying drawings shall be interpreted in an illustrative and not in a limiting sense.

What is claimed is:

1. A tool mounting head comprising a housing having a cylindrical opening and a channel communicating therewith, said channel having opposed parallel faces, the axis of said opening being disposed in the plane mid-way between said faces, a ram including a cylindrical portion slidably fitted in said bore and a fin portion slidably fitted in said channel, a locating block presenting a face that is part of one of said faces of said channel, a set screw extending through said housing and through the other of said faces of said channel into contact with the other of said faces of said fin in order to press said one face of said faces of said fin into contact with said face of said locating block, said ram providing a threaded bore having an axis coincident with the axis of said cylindrical portion, a micrometer screw journaled on said housing in mesh with said threaded bore, a dial rotatable with said micrometer screw, a dial indicator including an input rod and a pointer rotatable in response to reciprocal motion thereof, a minor motion of said rod producing a major motion of said pointer, a pin slidable in a bore in said ram, said pin abutting against an extremity of said rod, said pin and said ram normally moving as a unit to move said rod, the frictional forces between said pin and said ram being overcome in order to move said pin with respect to said ram when said rod is in a limiting position.

2. The tool mounting head of claim 1, wherein said ram and said locating block are composed of hard steel within the range of from 60 to 68 Rockwell C.

3. A tool mounting head comprising a housing having a cylindrical opening and a channel communicating therewith, said channel having opposed parallel faces, the axis of said opening being disposed in the plane mid-way between said faces, a ram including a cylindrical portion slidably fitted in said bore and a fin portion slidably fitted in said channel, a locating block presenting a face that is part of one of said faces of said channel, a set screw extending through said housing and through the other of said faces of said channel into contact with the other of said faces of said fin in order to press said one face of said faces of said fin into contact with said face of said locating block, said ram and said locating block being composed of hard steel within the range of from 60 to 68 Rockwell C, said ram providing a threaded bore having an axis coincident with the axis of said cylindrical portion, a micrometer screw journaled on said housing in mesh with said threaded bore, a dial rotatable with said micrometer screw, a dial indicator including an input rod and a pointer rotatable in response to reciprocal motion thereof, a minor motion of said rod producing a major motion of said pointer, a pin slidable in a bore in said ram, said pin abutting against an extremity of said rod, said pin and said ram normally moving as a unit to move said rod, the frictional forces between said pin and said ram being overcome in order to move said pin with respect to said ram when said rod is in a limiting position.

4. A tool mounting head comprising a housing having a cylindrical opening and a channel communicating therewith, said channel having opposed parallel faces, the axis of said opening being disposed in the plane mid-way between said faces, a ram including a cylindrical portion slidably fitted in said bore and a fin portion slidably fitted in said channel, a locating block presenting a face that is part of one of said faces of said channel, a set screw extending through said housing and through the other of said faces of said channel into contact with the other of said faces of said fin in order to press said one face of said faces of said fin into contact with said face of said locating block, said ram and said locating block being composed of hard steel within the range of from 60 to 68 Rockwell C, said ram providing a threaded bore at one end of said cylindrical portion having an axis coincident with the axis of said cylindrical portion, a micrometer screw journaled on said housing in mesh with said threaded bore, a dial indicator including an input rod and a pointer rotatable in response to reciprocal motion thereof, a minor motion of said rod producing a major motion of said pointer, a pin slidable in a bore in said ram, said pin abutting against an extremity of said rod, said pin and said ram normally moving as a unit to move said rod, the frictional forces between said pin and said ram being overcome in order to move said pin with respect to said ram when said rod is in a limiting position, a tool carried by said ram and extending through an elongated opening in said housing, the axis of said ram being in said plane mid-way between said faces of said fin portion, said ram providing a threaded bore at the other end of said cylindrical portion, a set screw meshing in said threaded bore at said other end of said cylindrical portion and bearing against said tool.

5. A tool mounting head comprising a housing having a cylindrical opening and a channel communicating therewith, a ram including a cylindrical portion slidably fitted in said bore and a fin portion slidably fitted in said channel, a locating block presenting a face that is part of one of said faces of said channel, a set screw extending through said housing and through the other of said faces of said channel into contact with the other of said faces of said fin in order to press said one face of said faces of said fin into contact with said face of said locating block, said ram providing a threaded bore having an axis coincident with the axis of said cylindrical portion, a micrometer screw journaled on said housing in mesh with said threaded bore, a dial rotatable with said micrometer screw, a dial indicator including an input rod and a pointer rotatable in response to reciprocal motion thereof, a minor motion of said rod producing a major motion of said pointer, a pin slidable in a bore in said ram, said pin abutting against an extremity of said rod, said pin and said ram normally moving as a unit to move said rod, the frictional forces between said pin and said ram being overcome in order to move said pin with respect to said ram when said rod is in a limiting position.

6. A tool mounting heat comprising a housing having a cylindrical opening and a channel communicating therewith, a ram including a cylindrical portion slidably fitted in said bore and a fin portion slidably fitted in said channel, said ram providing a threaded bore having an axis coincident with the axis of said cylindrical portion, a micrometer screw journaled on said housing in mesh with said threaded bore, a dial indicator including an input rod and a pointer rotatable in response to reciprocal motion thereof, a pin slidable in a bore in said ram, said pin abutting against an extremity of said rod, friction O-ring means operable between said pin and bore for securing said pin and ram together to move as a unit to move said rod, the frictional forces between said pin and said ram being overcome in order to move said pin with respect to said ram when said rod is in a limiting position.

7. A tool mounting head comprising a housing having a cylindrical opening and a channel communicating therewith, said channel having opposed parallel faces, a ram of material hardened with respect to said housing including a cylindrical portion slidably fitted in said bore and a fin portion slidably fitted in said channel, a locating block of material hardened with respect to said housing presenting a face that is part of one of said faces of said channel, a set screw extending through said housing and through the other of said faces of said channel into contact with the face of said fin opposite said locating block in order to press the face of the fin adjacent the locating block into contact with said locating block, said ram providing a threaded bore having an axis coincident with the axis of said cylindrical portion, a micrometer screw journaled on said housing in mesh with said threaded bore, a dial indicator including an input rod and a pointer rotatable in response to reciprocal motion thereof, a pin slidable in a bore in said ram, said pin abutting against an extremity of said rod, said pin and said ram normally moving as a unit to move said rod.

8. A tool mounting head comprising a housing having a cylindrical opening and channel communicating therewith having one hardened side, a ram including a cylindrical portion slidably fitted in said bore and a hardened fin portion slidably fitted in said channel, means for accurately adjusting said ram longitudinally of said opening, a pressure screw turned into a threaded bore in said housing in contact with the side of said fin opposite the hardened side of said channel, a visual indicator having a movable indicator element, and means interconnecting said ram and said indicator element such that a relatively small movement of said ram produces a relatively large movement of said indicator element.

References Cited in the file of this patent

UNITED STATES PATENTS

| | | |
|---|---|---|
| 1,486,968 | Kempton | Mar. 18, 1924 |
| 1,637,759 | Allen | Aug. 2, 1927 |
| 1,942,209 | Graves | Jan. 2, 1934 |
| 2,236,881 | Rusnak | Apr. 1, 1941 |
| 2,375,448 | Talbot et al. | May 8, 1945 |
| 2,590,420 | Lagher | Mar. 25, 1952 |
| 2,654,610 | De Vlieg | Oct. 6, 1953 |
| 2,748,665 | Senn | June 5, 1956 |
| 2,782,519 | Gill | Feb. 26, 1957 |

FOREIGN PATENTS

| | | |
|---|---|---|
| 640,028 | Germany | Dec. 19, 1936 |
| 711,011 | Germany | Sept. 24, 1941 |